United States Patent [19]

Harte

[11] Patent Number: 5,224,152
[45] Date of Patent: Jun. 29, 1993

[54] POWER SAVING ARRANGEMENT AND METHOD IN PORTABLE CELLULAR TELEPHONE SYSTEM

[75] Inventor: Lawrence J. Harte, Smithtown, N.Y.

[73] Assignee: Audiovox Corporation, Hauppauge, N.Y.

[21] Appl. No.: 572,409

[22] Filed: Aug. 27, 1990

[51] Int. Cl.⁵ .......................................... H04M 11/00
[52] U.S. Cl. ........................................ 379/59; 379/58; 455/343
[58] Field of Search ................... 379/58, 59, 61, 63; 364/707; 455/127, 343

[56] References Cited

U.S. PATENT DOCUMENTS

| | | | |
|---|---|---|---|
| 4,479,125 | 10/1984 | Mori | 455/343 |
| 4,518,961 | 5/1985 | Davis et al. | |
| 4,523,332 | 6/1985 | Mori | 455/343 |
| 4,577,315 | 3/1986 | Otsuka | 455/343 |
| 4,736,461 | 4/1988 | Kawasaki et al. | 455/343 |
| 4,745,408 | 5/1988 | Nagata et al. | 455/343 |
| 4,785,468 | 11/1988 | Yoshida | 455/343 |
| 4,839,639 | 6/1989 | Sato et al. | 455/343 |
| 4,852,148 | 7/1989 | Shibata et al. | 455/127 |
| 4,903,335 | 2/1990 | Shimizu | 455/343 |
| 4,955,080 | 9/1990 | Wagai et al. | 455/343 |
| 4,961,073 | 10/1990 | Drapac et al. | 455/343 |
| 4,964,121 | 10/1990 | Moore | 455/343 |
| 4,969,180 | 11/1990 | Watterson et al. | 379/58 |
| 4,977,611 | 12/1990 | Maru | 455/343 |
| 4,987,317 | 1/1991 | Pournain et al. | 455/343 |
| 4,995,099 | 2/1991 | Davis | 455/343 |
| 4,996,526 | 2/1991 | DeLuca | 455/343 |
| 5,001,471 | 3/1991 | Snowden et al. | 455/343 |
| 5,010,330 | 4/1991 | Snowden et al. | 455/343 |
| 5,027,428 | 6/1991 | Ishiguro | 455/343 |
| 5,031,231 | 7/1991 | Miyazaki | 455/343 |

OTHER PUBLICATIONS

European Publication (EP 0319219), Jun. 1989, Murai et al.

Primary Examiner—James L. Dwyer
Assistant Examiner—Dwayne D. Bost
Attorney, Agent, or Firm—Rosenman & Colin

[57] ABSTRACT

Battery power consumption of a cellular telephone is minimized during the stand-by mode by detecting when a received message is intended for another telephone, and for reducing battery power to at least one of the electronic components at the telephone when the transmitted message is intended for another telephone. Power is restored when the next transmitted message is expected to be received by the telephone.

15 Claims, 3 Drawing Sheets

POWER SAVING ARRANGEMENT AND METHOD IN PORTABLE CELLULAR TELEPHONE SYSTEM

BACKGROUND OF THE INVENTION

1. Field of the Invention

This invention generally relates to a power conserving arrangement for, and a method of, minimizing battery power consumption during stand-by operation of a portable, battery-operated, mobile station and, more particularly, a cellular telephone in a cellular telephone system.

2. Description of Related Art

A typical cellular telephone system includes a plurality of base stations or towers, each serving a pre-assigned geographical cell or region. Each base station transmits messages to a multitude of mobile stations, e.g. cellular telephones, in its region. Each telephone includes a transceiver and a decoder under microprocessor control.

During a stand-by mode of operation, each telephone waits to receive a telephone call. The message transmitted by a respective base station may be a so-called "global" message intended for all telephones, or, most frequently, an individual message intended for just one specific telephone. Hence, the individual message contains a unique mobile identification number (MIN), i.e. the telephone number. Each telephone has its unique MIN pre-stored in an on-board memory.

Many messages are transmitted by a respective base station and, of all those many messages, only a very small amount, if any, are intended for a particular telephone. Nevertheless, each telephone, during the stand-by mode of operation, continuously receives and decodes all messages transmitted by the respective base station until the decoder of a particular telephone recognizes its MIN, after which, the telephone operates in a talk (call in progress) mode. The telephone transmits and receives data, including voice data, to and from the base station in the talk mode.

It will be seen that conventional cellular telephones in current use consume electrical power in both the talk and the stand-by modes. In current portable battery-operated telephones, the on-board battery typically has a working lifetime of approximately 8 hours in the stand-by mode, and about 1-2 hours in the talk mode. The battery must then be re-charged or replaced to continue telephone service. A major electrical current consumer on-board the battery-operated cellular telephone during the stand-by mode is the receiver section of the transceiver which, as previously described, is continuously on while the telephone is waiting to decode its MIN. The microprocessor and other electronic components on-board the telephone are also energized during the stand-by mode and additionally contribute to current drain on the battery. The need to increase the battery working lifetime between re-charges and/or battery replacement is self-evident.

To aid in understanding the invention described herein, a brief review of the prior art structure of the message transmitted by the base station during stand-by operation is presented. The message is a digital stream of bits, and may have one or more words. Usually, a message includes two words. FIG. 1 schematically shows the prior art structure of each word of the message. Each word contains forty bits. The first twenty-eight bits are message data containing, among other things, the MIN and/or a global message and/or a channel assignment message, etc. The last twelve bits are a sequence or parity field of check bits (BCH) and is a block code parity check sum. The BCH parity field confirms that the message data in the first twenty-eight bits were correctly received.

To overcome the problem of messages that are sometimes lost by rapidly changing radio signals, each word of the message is transmitted from the base station to each portable telephone five times. For a message to be validated, each word must be correctly received at least three out of the five times before the telephone will respond to the message. In addition, to compensate for burst errors, words are interleaved and transmitted in a format based on whether the MIN is odd or even.

FIG. 2 schematically shows the prior art structure of the interleaved format wherein each word A (designated for even telephone numbers) and each word B (designated for odd telephone numbers) is repeated five times and, for each repetition, the even word A is alternated with the odd word B. In addition, FIG. 2 shows a dotting sequence D which is a sequence of ten bits that advises the telephone that a synchronization word S is coming. The dotting sequence produces a 5 kHz frequency signal which is a precursor and a gross indicator that a message is about to start. The synchronization word is a sequence of eleven bits, and includes a synchronization pattern by which an internal clock of the telephone is synchronized to the base station transmitter.

Also imposed on the message data stream are busy-idle bits which are schematically shown in FIG. 3. A busy-idle bit is sent every ten bits of the message to indicate the status of the system channel. If the busy-idle bit is set to logic 1, then the channel is not busy. If the busy-idle bit is set to logic 0, then the channel is busy. The data rate for transmitted bits is 10 kbps. Hence, as shown in FIG. 2, 463 bits are transmitted in 46.3 msec, and is the total time in which one odd and one even word is transmitted five times in an interleaved format.

As previously noted, a message may, and typically does, contain more than one word. When this happens, each word also advises the on-board microprocessor that more words for the complete message are coming.

FIG. 4 schematically shows the prior art structure and duration of a complete message that consists of two words wherein word C is the second word of the message for an even telephone number which had word A as the first word, and wherein word D is the second word of the message for an odd telephone number which had word B as the first word. A two-word message takes 92.6 msec to be completely transmitted.

SUMMARY OF THE INVENTION

1. Objects of the Invention

It is a general object of this invention to advance the state of the art of cellular telephone systems.

It is another object of this invention to increase the battery working lifetime between re-charges and/or battery replacement in cellular telephone systems.

Another object of this invention is to prolong the working lifetime of portable, battery-operated, cellular telephones in the stand-by mode.

A further object of this invention is to substantially reduce power consumption in such portable cellular telephones.

2. Features of the Invention

In keeping with these objects, and others which will become apparent hereinafter, one feature of this invention resides, briefly stated, in a power conserving arrangement for, and a method of, minimizing battery power consumption at one mobile station, particularly a portable, battery-operated cellular telephone, during a stand-by mode of operation in which messages transmitted by a base station of a system, particularly a cellular telephone system, are received by on-board receiver means at the cellular telephone.

The invention comprises detector means for detecting when a transmitted message received by the receiver means at the telephone is intended for another station in a non-calling state. In response to detection of the non-calling state, this invention proposes the use of power conserving means operative for reducing battery power to at least one on-board electronic means at the telephone. The battery power reduction is maintained by the power conserving means for a time period whose duration lasts until another transmitted message is expected to be received by the receiver means at the telephone.

The power conserving means includes control means, preferably a control switch switchable between a pair of switching states in which battery power is supplied and denied, respectively, to one or more of the various electronic means at the telephone. Battery power may be supplied or denied to the aforementioned receiver means, or a powered display means, or a microprocessor which controls overall operation of the telephone. The various electronic means can be simultaneously or sequentially supplied or denied battery power.

The control switch is switchable between its switching states by a settable stand-by timer means under the control of the microprocessor. The microprocessor determines the aforementioned time period between successive messages, and sets the timer to generate a timer output signal for controlling the control switch upon elapse of said time period. A memory store and an address store may be used for storing data and addresses, respectively, of data needed by the microprocessor to resume operation in the event that the latter is de-energized during the stand-by mode. Hence, when the detector means determines that a given word of a transmitted message is not intended for a particular telephone, the microprocessor can determine the amount of time until the next word is expected to be received. The receiver means is de-energized during this time period. Since the receiver means is a major electrical current consumer, a substantial reduction of power consumption at the telephone is obtained. Additional power savings can be obtained by de-energizing other electronic means at the telephone. The receiver means, as well as the other electronic means, are re-energized upon the elapse of said time period. The microprocessor sets the stand-by timer means for this time period.

The duration of the time period is variable, and depends upon when the first word of a message is confirmed as being intended for another telephone. This could occur at the first, second, third, fourth or fifth repetition of the word.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENT

Figure 1:
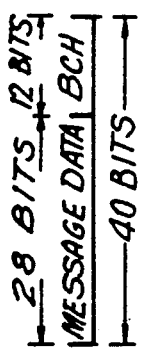
FIG. 1 is a schematic representation of the structure of a word transmitted in a cellular telephone system according to the prior art.
Figure 2:
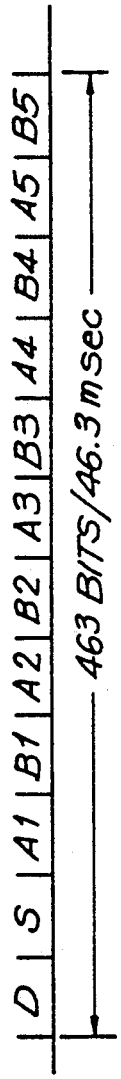
FIG. 2 is a schematic representation of the structure of an odd word and an even word transmitted in an interleaved format in a cellular telephone system according to the prior art.
Figure 3:
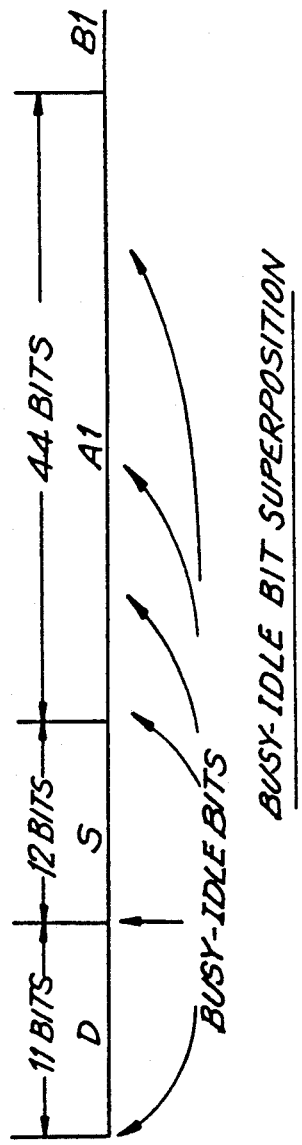
FIG. 3 is a schematic representation of a portion of a word of a message specifically showing busy-idle bits imposed on the data stream according to the prior art.
Figure 4:
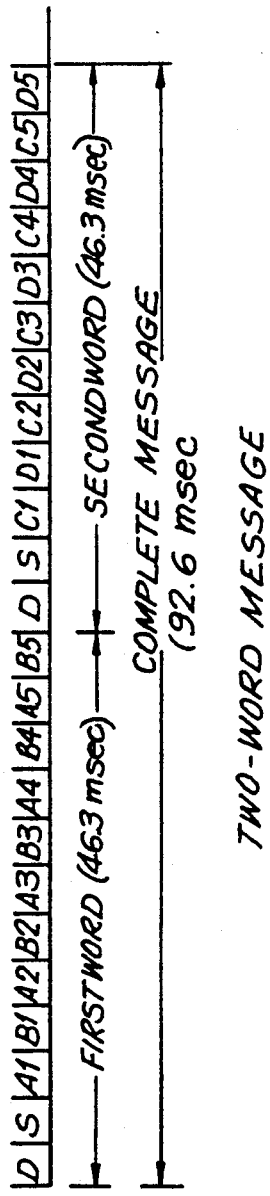
FIG. 4 is a schematic representation of the structure of a two-word message transmitted by a cellular telephone system according to the prior art.
Figure 5:
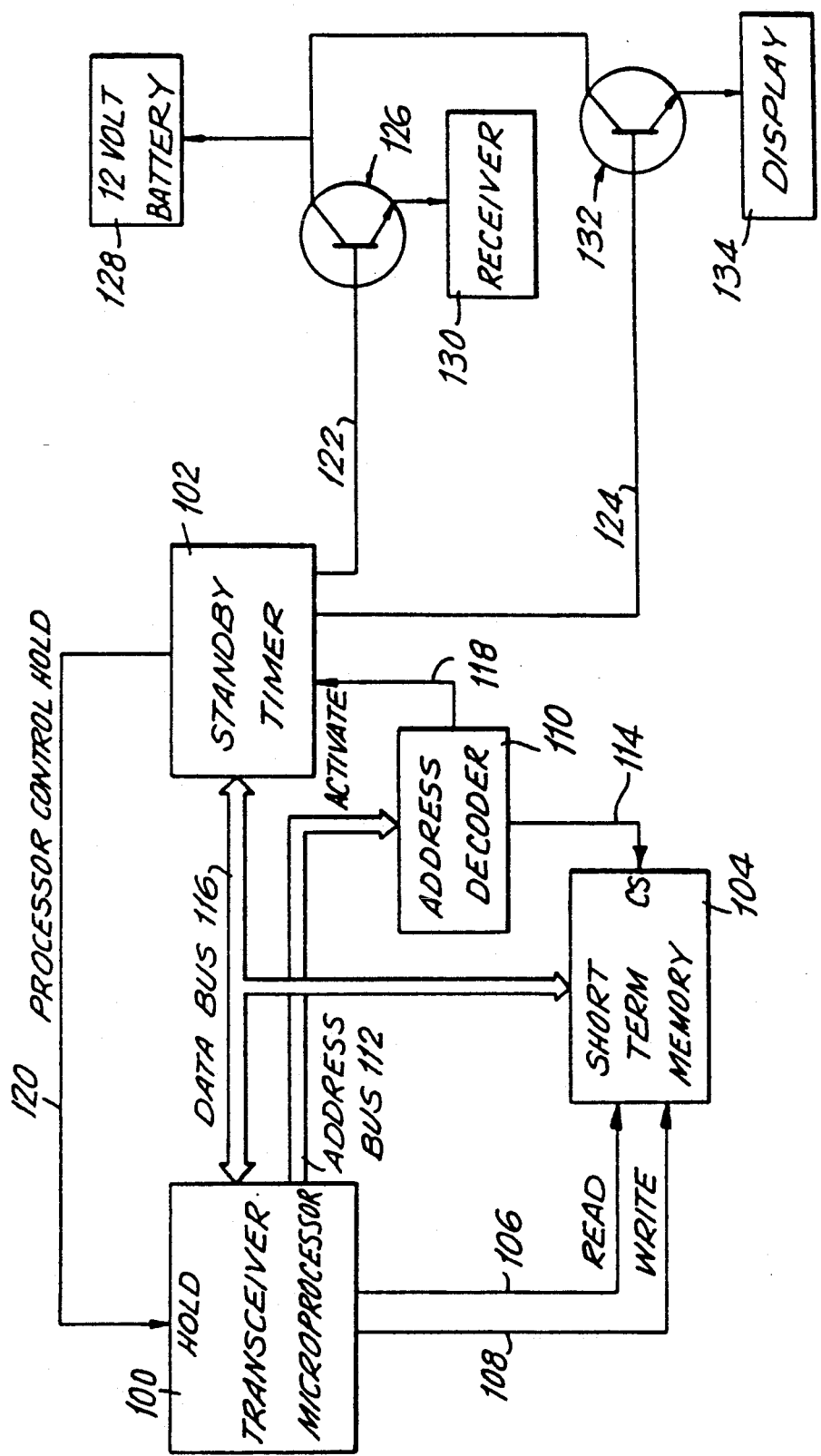
FIG. 5 is an electrical schematic diagram of a power conserving arrangement for minimizing battery power consumption in accordance with this invention.

Referring now to FIG. 5, reference numeral 100 generally identifies a programmed transceiver microprocessor for controlling operation of a portable, battery-operated cellular telephone. The structure and operation of the microprocessor 100 are well known in the art. For example, the entire contents of The Bell System Technical Journal, Vol. 58, No. 1, January 1979, are hereby incorporated herein by reference.

Figure 6:
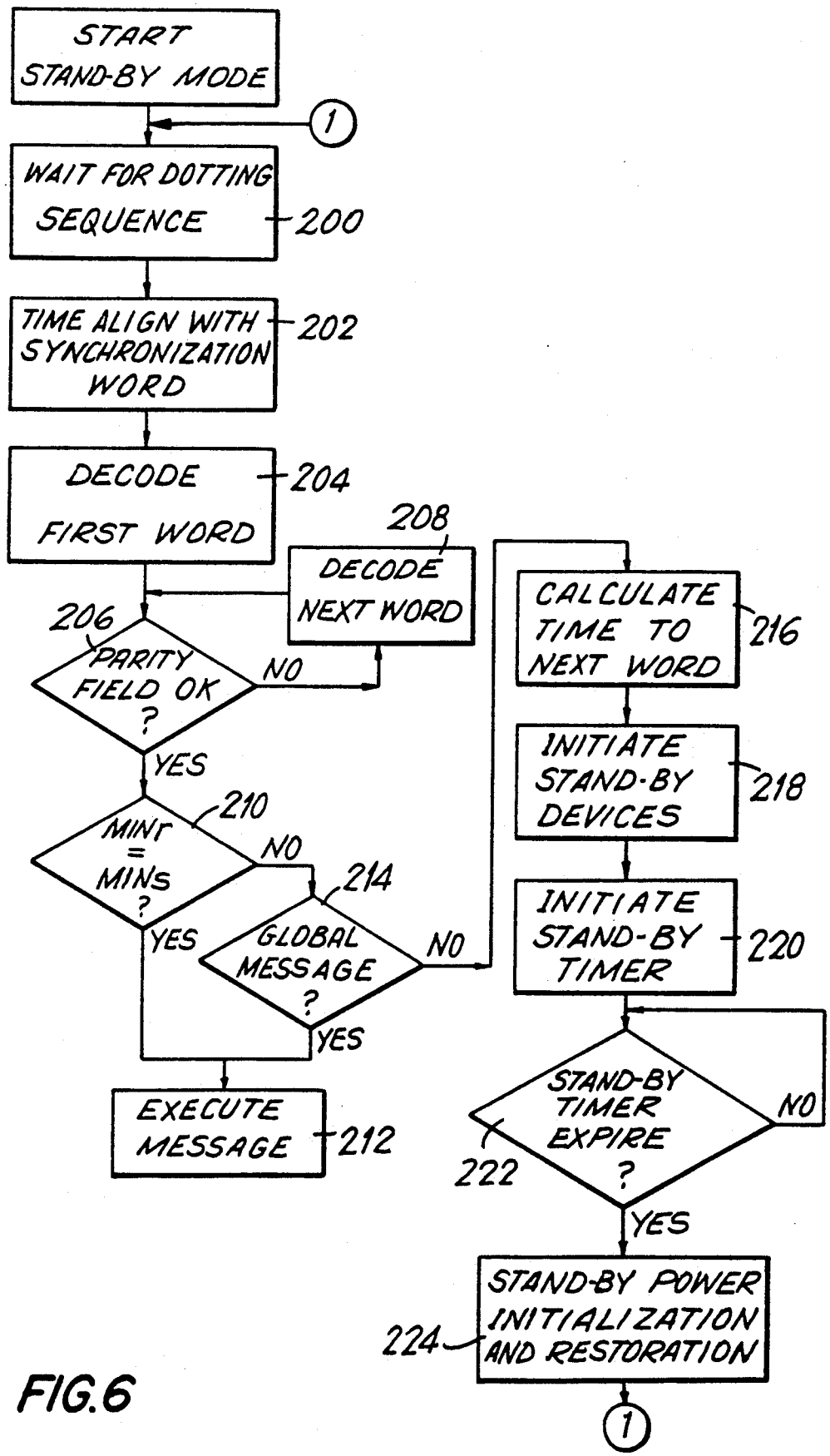
FIG. 6 is a flow chart depicting the operation of a transceiver microprocessor used in the power conserving arrangement in accordance with this invention.

The operation of the microprocessor is schematically shown in flow chart form in FIG. 6. As previously described, during the stand-by mode, the microprocessor 100 is programmed to wait for the dotting sequence D (block 200), to thereupon time align with the synchronization word S (block 202), and thereupon to receive and decode the first reception of the first word of the message (block 204), i.e. word A1 for an even MIN, or word B1 for an odd MIN. After the first reception of the first word is decoded, the parity field is checked (block 206) to validate whether the word A1 or B1 was correctly received and decoded. If the parity field does not validate the decoding of the first reception of the first word, then the microprocessor 100 receives and decodes the second reception of the first word (block 208), i.e. A2 or B2. In analogous manner, the reception and decoding of the third, fourth and fifth receptions of the first word continue until the parity field validates the reception and decoding of a word.

As soon as the parity field has validated the decoding of a received word, then the incoming MIN of the received word ($MIN_r$) is compared (in block 210) to a pre-stored MIN ($MIN_s$) of the telephone. If a match is made, then the telephone executes the message (block 212). If a match is not made, then the microprocessor 100 next checks to see if the incoming message is a global message intended for all telephones (block 214). If the incoming message is not a global message, and if the match between the incoming MIN and the pre-stored MIN is not made, then the microprocessor knows that the incoming message is not intended for this particular telephone and, in fact, is intended for some other telephone. The detection of this "non-calling" state is the triggering event employed by the power conserving arrangement of this invention to conserve battery power by reducing, and preferably interrupting, battery power to one or more electronic components, particularly the receiver circuit of the transceiver, at the telephone. As described below, power reduction or interruption is maintained for a time period of variable duration which begins upon the first validation of a word, and which expires when the next transmitted message is expected to be received.

Returning to FIG. 5, the microprocessor 100 is operatively connected to a settable stand-by timer 102. Advantageously, the timer is a CMOS timer. A short-term memory store 104 is operatively connected to the microprocessor 100 by read line 106 and write line 108. The memory store 104 is operative for storing data from the microprocessor. An address decoder 110 is operatively connected to the microprocessor by an address bus 112, and is also connected to the memory store 104 by an address line 114. The address decoder 110 stores the addresses of the data stored in the memory store 104. A bi-directional data bus 116 interconnects the microprocessor 100, the stand-by timer 102 and the memory store 104.

The stand-by timer 102 is connected to the address decoder 110 by an activate line 118, and is also connected to the microprocessor via a control hold line 120.

The timer 102 has at least one timed output line and, as shown in FIG. 5, a pair of timed output lines 122, 124. Output line 122 is connected to a control switch 126 operatively connected between a battery 128 and the receiver section 130 of the transceiver. Output line 124 is connected to a control switch 132 operatively connected between the battery 128 and another electronic component at the telephone, e.g. a powered display 134.

Returning to FIG. 6, as soon as the microprocessor has detected the non-calling state, it calculates the time period until the next word is expected to be received (block 216). This time period may be calculated by the following formula:

For telephones that decode even words A, $$T = 48.4 \; msec - 8.8 \; msec \; (n) + 46.3 \; msec \; (NAWC);$$

For telephones that decode odd words B, $$T = 44.0 \; msec - 8.8 \; msec \; (n) + 46.3 \; msec \; (NAWC);$$

wherein n is the number of words that have been repeated,

NAWC is the number of additional different words to come, and

T is the time period between transmitted messages.

The above numerical times are presented for the specific words and transmission times set forth above in connection with FIGS. 1-4. Since even words A precede odd words B, the time period T varies depending on whether the telephone decodes even words or odd words.

Hence, the microprocessor has calculated the time to the next word. It stores necessary operating parameters such as the control channel number, the malfunction timer value, etc. into the short-term memory store 104 via data bus 116, and into the address decoder 110 via the address bus 112 (block 218). The microprocessor then initiates the stand-by timer 102 (block 220) which, in turn, generates a control hold output signal on line 120 to power down the microprocessor during the time period T. The stand-by timer 102 also generates timer output signals on control line 122, 124 to actuate control switches 126, 132 between its switching states, and either reduces or interrupts battery power from the battery 128 to the receiver 130 and the powered display 134. The timer output signals on lines 122, 124 may be either simultaneously or sequentially generated. Due to initialization of displays, data bus devices, and radio frequency stabilizers, certain electronic components at the transceiver may be selectively inhibited. Frequency synthesizers, i.e. a radio frequency oscillator, may require a finite time to stabilize, e.g. on the order of three msec. Hence, the frequency synthesizer, if turned off during the stand-by mode, may need to be activated at least three msec prior to reactivation of all the other electronic components turned off during the stand-by mode. In addition, the frequency synthesizer, as well as other data dependent devices, such as a data register, may need to be refreshed with an initialization sequence after activation.

Upon expiration of the calculated time period (block 222), the stand-by timer 102 switches the control switches 126, 132 to their former states in which power is returned to the receiver 130 and the display 134, as well as the microprocessor 100. This restoration of power (block 224) may be simultaneous or sequential among the various electronic components. The data stored in the address decoder 110 and the memory store 104 is retrieved, and the telephone, once again, starts the stand-by mode by waiting for the dotting sequence (block 200).

Hence, one or more electronic components at the telephone are de-energized between messages. This saves electrical power since there is no reason for the receiver, as well as other electronic components at the telephone, to be energized between messages. The only component that needs to be energized at all times is, of course, the stand-by timer 102, but this component consumes far less power than the receiver 130, the display 134, the microprocessor 100, as well as any of the other electronic components at the telephone. For timing accuracy, the on-board reference clock (crystal oscillator) should never be de-energized.

Although the above invention has been described in connection with cellular telephones, it is not intended to be so limited since the power conserving arrangement and method of this invention can be used advantageously with beepers, pagers, and, in short, any system having multiple mobile stations which are self-identifiable upon receipt of transmitted messages.

It will be understood that each of the elements described above, or two or more together, also may find a useful application in other types of constructions differing from the types described above.

While the invention has been illustrated and described as embodied in a power saving arrangement and method in portable cellular telephone system, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. In a system having a base station operative for transmitting messages having repeated words to portable, battery-operated, mobile stations, each having on-board electronic means including receiver means operative for receiving the transmitted messages in a stand-by mode, a power-conserving arrangement for minimizing battery power consumption at one mobile station during the stand-by mode, said arrangement comprising:
    (a) detector means for detecting that a transmitted message received by the receiver means at said one mobile station is intended for another station in a non-calling state, said detector means including a programmed microprocessor at said one mobile station, said microprocessor having means for determining a time period between successive messages, said time period being a function of the number of words that have been repeated and the number of additional different words to come; and
    (b) power-conserving means responsive to detection of the non-calling state, for reducing battery power to at least one of the electronic means at said one mobile station, and for maintaining the battery power reduction throughout said time period.

2. The arrangement according to claim 1, wherein the mobile stations are cellular telephones having unique identification numbers incorporated in the transmitted messages, and wherein the detector means is operative for detecting the unique identification number for the telephone of said one mobile station in a calling state, and for detecting other identification numbers intended for other telephones in the non-calling state; and wherein the power-conserving means is responsive to detection of the other identification numbers for said telephone.

3. The arrangement according to claim 2, wherein the power-conserving means includes control means operatively connected to said at least one electronic means, and operative for controlling battery power to said at least one electronic means.

4. The arrangement according to claim 3, wherein the control means is a control switch operatively connected to the receiver means, and switchable between a pair of switching states in which battery power is supplied and denied, respectively, to the receiver means.

5. The arrangement according to claim 4, wherein the control switch is also operatively connected to a powered display means, and respectively supplies and denies battery power to the display means in the switching states.

6. The arrangement according to claim 3, wherein the power-conserving means includes settable stand-by timer means operatively connected to the control means, and operative for generating a timer output signal for controlling the control means upon elapse of said time period.

7. The arrangement according to claim 6, wherein the control means is operatively connected to a plurality of said electronic means, and wherein the timer output signal simultaneously controls all said electronic means.

8. The arrangement according to claim 6, wherein the control means is operatively connected to a plurality of said electronic means, and wherein the timer output signal sequentially controls all said electronic means.

9. The arrangement according to claim 6, wherein the programmed microprocessor is operatively connected to the stand-by timer means, and is operative for setting the stand-by timer means to generate the timer output signal upon elapse of said time period.

10. The arrangement according to claim 9, wherein the control means is a control switch operatively connected to the programmed microprocessor, and switchable between switching states in which battery power is supplied and denied, respectively, to the programmed microprocessor.

11. The arrangement according to claim 10, wherein the power-conserving means includes a memory means for storing data from the programmed microprocessor, and an address means for storing addresses of the stored data during said time period.

12. The arrangement according to claim 1, wherein the power-conserving means restores battery power upon the elapse of said time period.

13. The arrangement according to claim 12, wherein the power-conserving means includes means for initializing data-dependent electronic means prior to elapse of said time period.

14. In a cellular telephone system operative for transmitting messages having repeated words to portable, battery-operated, mobile cellular telephones, each having on-board electronic means including receiver means operative for receiving the transmitted messages in a stand-by mode, a power-conserving arrangement for minimizing battery power consumption at one cellular telephone during the stand-by mode, said arrangement comprising:
    (a) detector means for detecting that a transmitted message received by the receiver means at said one cellular telephone is intended for another cellular telephone in a non-calling state, said detector means including a programmed microprocessor at said one cellular telephone, said microprocessor having means for determining a time period between successive messages, said time period being a function of the number of words that have been repeated and the number of additional different words to come; and
    (b) power-conserving means responsive to detection of the non-calling state, for reducing battery power to at least one of the electronic means at said one cellular telephone, and for maintaining the battery power reduction throughout said time period.

15. In a system having a base station operative for transmitting messages having repeated words to portable, battery-operated, mobile stations, each having on-board electronic means including receiver means operative for receiving the transmitted messages in a stand-by mode, a method for minimizing battery power consumption at one mobile station during the stand-by mode, said method comprising the steps of:
    (a) detecting that a transmitted message received by the receiver means at said one mobile station is intended for another station in a non-calling state, said detecting step including determining a time period between successive messages, which time period is a function of the number of words that have been repeated and the number of additional words to come; and
    (b) reducing battery power to at least one of the electronic means at said one mobile station in response to detection of the non-calling state, and maintaining the battery power reduction throughout said time period.

* * * * *